United States Patent
Winn

(10) Patent No.: US 7,461,763 B1
(45) Date of Patent: Dec. 9, 2008

(54) DISPENSER FOR SOLID FLOWABLE BULK MATERIAL

(76) Inventor: James C. Winn, 424 Castle Rd., McHenry, IL (US) 60050-7101

( * ) Notice: Subject to any disclaimer, the term of this patent is extended or adjusted under 35 U.S.C. 154(b) by 254 days.

(21) Appl. No.: 10/732,139

(22) Filed: Dec. 10, 2003

Related U.S. Application Data

(60) Provisional application No. 60/432,221, filed on Dec. 10, 2002.

(51) Int. Cl.
*G01F 11/20* (2006.01)
(52) U.S. Cl. .................... 222/413; 222/232; 222/185.1; 222/181.1; 222/158
(58) Field of Classification Search ......... 222/412–414, 222/231–232, 240–241, 181.1, 185.1, 158, 222/235–236
See application file for complete search history.

(56) References Cited

U.S. PATENT DOCUMENTS

| | | | | |
|---|---|---|---|---|
| 3,013,701 A | * | 12/1961 | Joschko | 222/227 |
| 3,150,798 A | * | 9/1964 | Sutton | 222/32 |
| 3,411,675 A | * | 11/1968 | Wahl | 222/238 |
| 4,790,457 A | * | 12/1988 | Morse et al. | 222/158 |
| 4,802,609 A | * | 2/1989 | Morse et al. | 222/158 |
| 5,016,789 A | * | 5/1991 | Singh | 222/608 |
| 5,139,173 A | * | 8/1992 | Evinger | 222/185.1 |
| 5,222,634 A | * | 6/1993 | Hayes | 222/185.1 |
| 5,480,061 A | * | 1/1996 | Ellinger | 221/75 |
| 5,715,976 A | * | 2/1998 | Kautz | 222/413 |
| 5,730,333 A | * | 3/1998 | Baluk et al. | 222/181.3 |
| 5,769,281 A | | 6/1998 | Bates | |
| 5,826,754 A | * | 10/1998 | Ishaya et al. | 222/185.1 |
| 5,833,097 A | * | 11/1998 | Ruth | 222/368 |
| 6,340,279 B1 | | 1/2002 | Wipf | |

* cited by examiner

*Primary Examiner*—Frederick C. Nicolas
(74) *Attorney, Agent, or Firm*—Jon Carl Gealow

(57) ABSTRACT

A dispenser for solid flowable material such as breakfast cereal having a storage hopper positioned above a rotatable auger dispenser. The storage hopper being provided with off-set baffles to prevent bridging of the flowable material in the hopper and to support the flowable material to reduce the weight of the flowable material resting on the auger. One of the off-set baffles extending to the top center of the auger such that the flowable material flows directly downward on only one side of the auger. Still another baffle in the hopper extends downwardly and inwardly from discharge end of the auger to prevent discharge of the flowable material without rotation of the auger.

8 Claims, 5 Drawing Sheets

DISPENSER FOR SOLID FLOWABLE BULK MATERIAL

The following U.S. patent application is hereby incorporated by reference in its entirety for its teaching:

U.S. Provisional Patent Application Ser. No. 60/432,221, for Dispenser for Solid Flowable Material, by James C. Winn, filed Dec. 10, 2002.

FIELD OF THE INVENTION

The present invention relates to a dispenser for solid flowable bulk material. More particularly it relates to a dispenser for dry breakfast cereal of the flowable type.

BACKGROUND OF THE INVENTION

In the retail food industry, including both grocery stores and restaurants, there is a need for a dispenser for solid flowable bulk materials, such as cereals, coffee, nuts, and other similar products. While cereal intended for serving in restaurants and cafeterias, may be provided in packages designed for individual servings, the individual packaging adds considerably to the overall cost of the cereal, especially when one considers the cost of the packaging, the greater storage space required, and the cost of collecting and disposing of the packaging. It would be highly desirable to have a dispenser for each type of cereal served in a restaurant or cafeteria. In a restaurant in would be desirable for a wait person to be able to easily dispense a serving of a particular cereal into a bowl. Similarly, in a cafeteria it would be desirable for a patron to be able to easily dispense a serving of cereal into a bowl. Bulk dispensers have been tried in such application in the past, but have not fully met the desired performance expectations. For instance, bulk dispensers consisting of a storage bin located over a screw feed or auger have been tried. However, with this type of dispenser, a frequent problem has been the jamming or bridging of the bulk material in the storage bin, such that it does not flow to the screw feeder or auger. Another problem has been the crushing or shearing of the bulk material by the screw feed or auger.

Accordingly, it would be desirable to provide a dispenser for flowable bulk materials, such as cereals, coffee, nuts and other similar products, which would readily dispense a desired amount of the bulk material without significant damage to the material, such as by crushing. It would be further desirable that the dispenser be usable with various types of bulk material, such as different types of breakfast cereal. Another desirable feature would be that the dispenser be readily manually operable by hand, without the need for an electrical connection to an electricity source to energize a motor or a solenoid operator. Still another desirable feature would be that the dispenser be readily disassembled for a complete cleaning to assure that the dispenser meets sanitary requirements.

SUMMARY OF THE INVENTION

It is an object of this invention to provide a dispenser for solid bulk material which overcomes the problems usually associated with such dispensers in the past. It is another object of this invention to provide a dispenser for solid bulk material such as breakfast cereal which will readily dispense a serving of the cereal without significant crushing of the cereal. It is another object of the invention to provide a solid bulk material dispenser which is simply and readily operable by a person to dispense a desired amount of the bulk material. It is another object of the invention to provide a solid bulk material dispenser which is readily disassembled to permit a through cleaning so as to meet food handling sanitation requirements. It is still another object of the invention to provide a solid bulk material dispenser which may be filled with a large quantity of the bulk material, which will flow through the dispenser without jamming.

A solid bulk material dispenser in accordance with this invention includes a storage bin located over a screw or auger type feed mechanism. The storage bin or hopper is designed to eliminate jamming or packing of the bulk material in the bin, and to deliver the bulk material to the screw feed in such a way that it is not crushed by rotation of the auger. Baffles or offset deflector floors are provided on the walls of the hopper to prevent the bulk material in the hopper from forming a bridge due to settling of the bulk material in the hopper. By offsetting the deflector floors, unbalanced settling is created at different levels in the hopper, such that the bulk material can not settle evenly, thereby forming a structural arch or bridge which prevents downward flow of the bulk material located above the bridge. The weight of the bulk material is distributed over the offset deflector floors, removing the weight from over the auger screw mechanism, thereby relieving the pressure of the bulk material on the auger screw. Thus, less friction occurs between the screw and the bulk material, which friction would otherwise cause the bulk material to jamb around the screw. The applicant new dispenser is designed to regulate the flow of bulk material into the screw feed, and to feed the material out of the screw without damage to the bulk material. The lowermost offset deflector decreases the amount of product that is fed into the auger screw chamber, thus preventing packing of the bulk material in the screw chamber. The lowermost offset deflector positioned above the auger screw has a lower edge which parallels the central axis of the auger, thereby decreasing the amount of product that is sheared or crushed by the auger screw threads. The lowermost offset deflector is located directly above the auger screw at approximately a 45 degree angle with respect to a vertical plane passing through the central axis of the auger, so as to divide the circumference of the auger screw in half, allowing for a flow feed side and a bulk product movability side. The lowermost offset deflector is located directly above the auger screw at approximately a 45 degree angle, so as to divide the circumference of the auger screw in half, allowing for a flow feed side and a bulk product movability side. That is, the bulk product is only fed into one side of the auger screw threads, thereby minimizing pressure around the auger screw threads. The leading edge of the deflector shelf and the leading edge of the auger screw threads meet at severe angles, rather than in blunt surface to surface contact which would shear and crush the bulk material. The stationary deflector floor holds back the weight and flow of the bulk material, while the leading edge of the auger screw glides by the deflector at an angle to push the bulk material in the feed direction. Operation of the auger or worm screw both agitates the bulk material flowing from the hopper and transfers the bulk material out of the dispenser. The chamber in which the auger screw rotates is of the same circumference as the auger screw plus or minus several thousands of an inch, so as to eliminate pinching or crushing of product at the bottom of the barrel chamber and to allow ease of product movement. Further, product crumb material is moved with the product from the dispenser, thus cleaning the barrel chamber.

DETAILED DESCRIPTION OF THE PREFERRED EMBODIMENT

Figure 1:
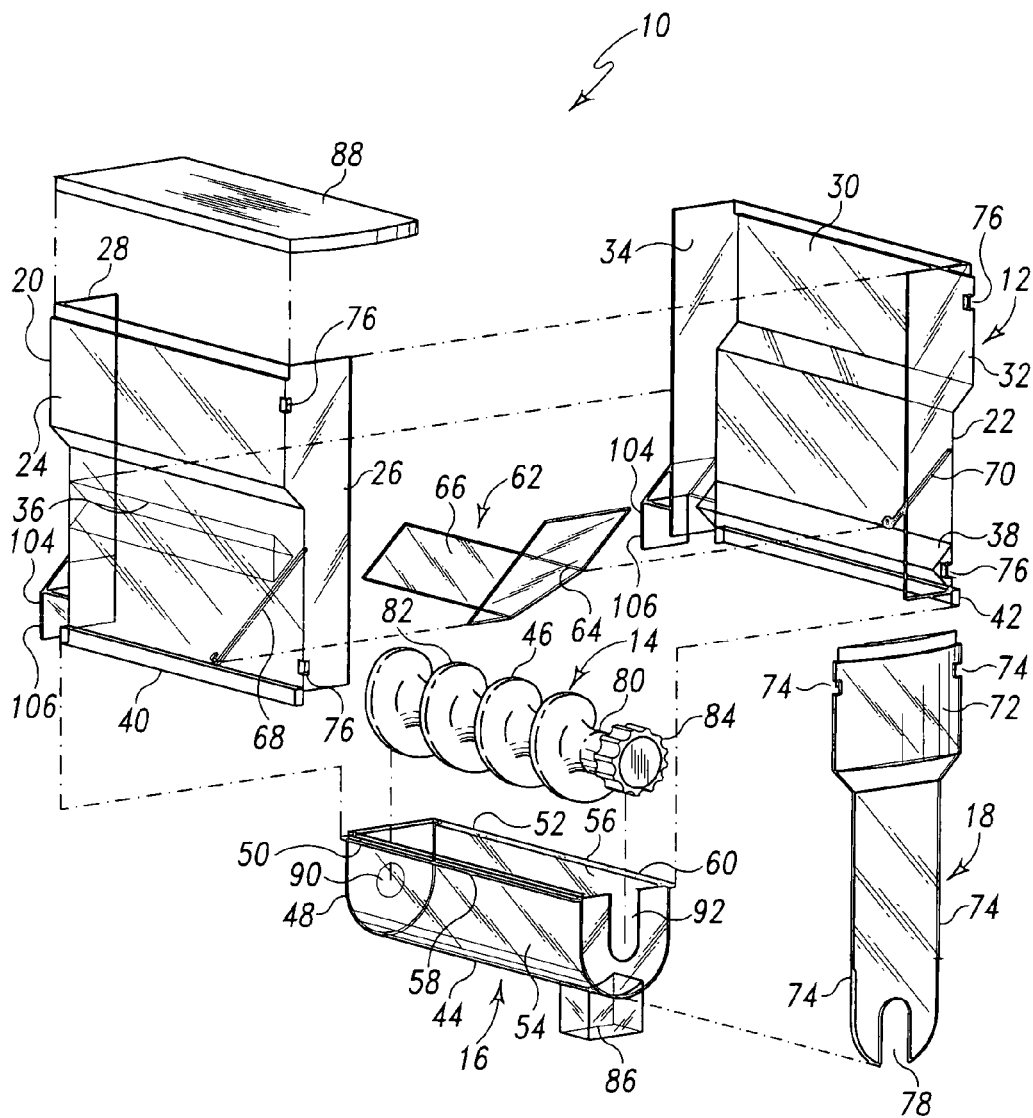
FIG. 1 is an exploded perspective view of a solid bulk material dispenser in accordance with this invention.
Figure 2:
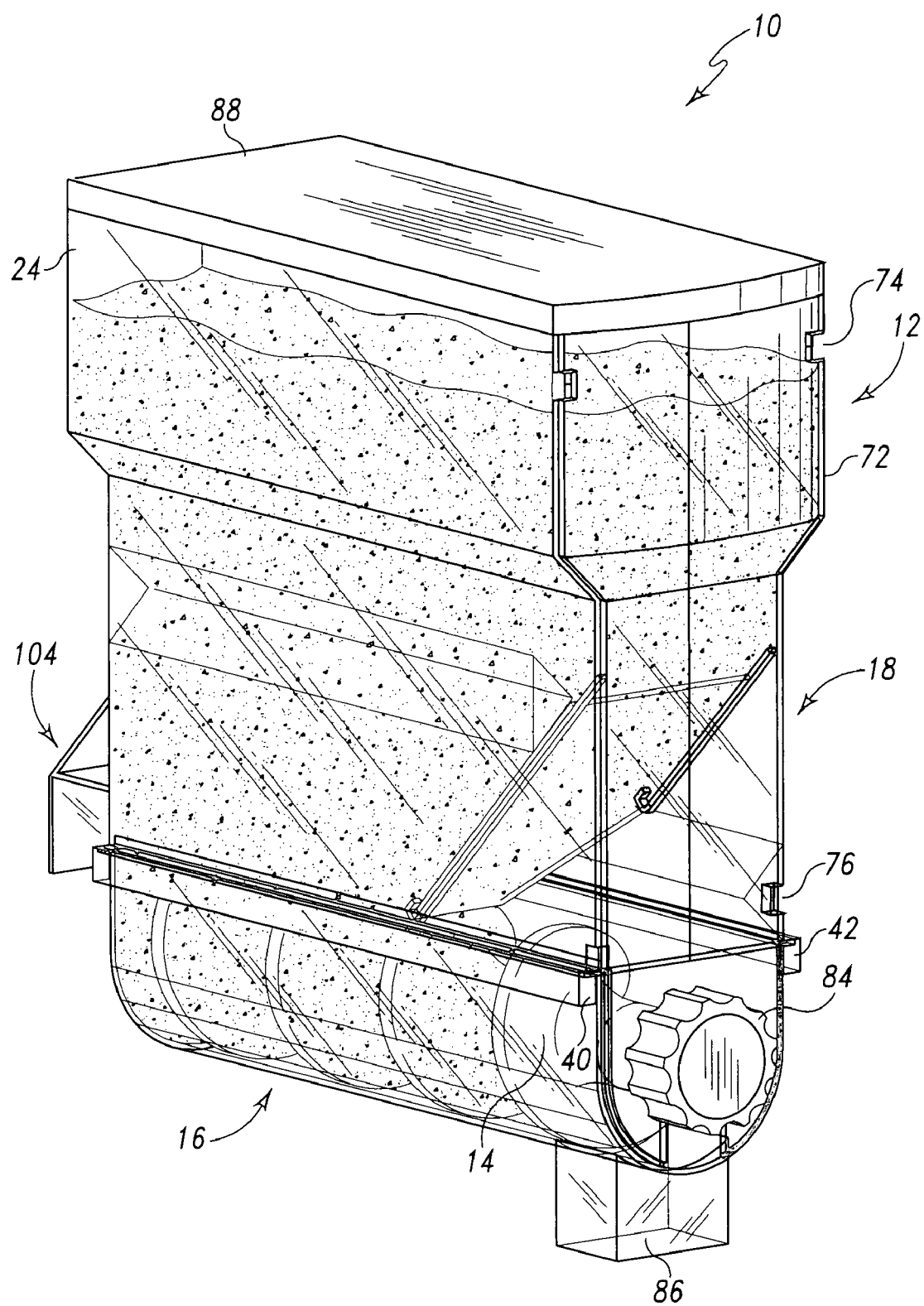
FIG. 2 is a perspective view of the solid bulk material dispenser of this invention as shown in FIG. 1.

Referring to FIGS. 1 and 2, the preferred embodiment of the solid bulk material dispenser of this invention will be described. In the preferred embodiment, a dispenser 10 is formed of a transparent plastic material. The dispenser is formed of four components which are readily assembled for use and disassembled for cleaning. A first component is a hopper assembly 12, in which the solid flowable bulk material to be dispensed is stored. The second component is an auger and handle assembly 14. The third component is an auger housing and dispensing chute assembly 16. Finally, the fourth component is a front locking plate 18.

The dispenser hopper is formed by a pair of members 20 and 22. Member 20 forms a sidewall 24, portion 26 of a front wall, and a portion 28 of a back wall of the hopper. Member 22 forms a sidewall 30, a portion 32 of the front wall, and a portion 34 of the back wall of the hopper. Member 20 is provided with a deflector 36, extending across the sidewall 24. Member 22 is provided with a deflector 38, extending across the sidewall 30. Deflector 38 is located closer to the bottom of the sidewall 30 than is the deflector 36 on sidewall 24. The members 20 and 22 are provided with elongated socket like outwardly extending projections 40 and 42 at their lower ends for use in attaching the hopper assembly 12 to the auger housing and dispensing chute assembly 16.

The auger housing and dispensing chute assembly 16 is formed with a lower curved wall 44 which is of essentially the same diameter as that of auger 46, of the auger and handle assembly 14, which is received in the auger housing 48 of auger housing and dispensing chute assembly 16. The upper edges 50 and 52 of sidewalls 54 and 56 of the auger housing 48 are provided with outwardly extending projections 58 and 60 respectively. When assembling the dispenser, the projections 58 and 60 are received in the elongated socket like projections 40 and 42, to secure the auger housing and dispensing chute assembly 16 to the hopper assembly 12.

A third deflector assembly 62 includes a first deflector 64, and a connected deflector 66. Deflector 64 is perpendicular to the plane of the side walls 24 and 30, and at an angle with respect to the front wall portions 26 and 32. When assembling the dispenser, the third deflector assembly 62 is placed between the members 20 and 22, with the deflector 66 resting on top of the deflector 30, and with the deflector 64 extending downwardly at an angle from the portions 18 and 24 of the front wall, and resting on the supports 68 and 70 formed on the sidewalls 24 and 30.

An outer front wall 72 of locking plate 18 is provided with a pair of spaced apart securing tabs 74 on each side which are placed to engage with cooperating securing devices 76 formed on portions of the side walls 24 and 30 which extend in front of front wall portions 26 and 32. The lower end of outer front wall 72 is provided with a vertical elongated notch 78 which receives a shaft portion 80 of the auger 46, located between threaded portion 82 of the auger 46 and a knob 84. Dispensing chute 86 is located under the front end of the threaded portion 82 of the auger 46. A cover 88 is provided to close the top of the hopper.

The manner in which the dispenser 10 of this invention is readily assembled for use and disassembled for cleaning will now be described. While members 20 and 22 are shown as separate parts in FIG. 1, they are permanently secured to each other by bonding their abutting edges. Similarly, the third deflector assembly 62 is permanently secured to the supports 68 and 70. The first step in assembling the dispenser 10 is to place the auger and handle assembly 14 in the auger housing and dispensing chute assembly 16. A hole 90 is provided in the back wall of the auger housing 48 to receive a rearwardly extending shaft (not shown) of the auger and handle assembly 14. At the front, the shaft portion 80 is received in an elongated notch 92 having a curved bottom of approximately the same diameter as the shaft portion 80.

The next step in the assembly is to slide the hopper assembly 12 rearwardly over the auger housing 48, such that the projections 58 and 60 on the auger housing 48 are received in the elongated socket like projections 40 and 42 on the hopper assembly to secure the auger housing and dispensing chute assembly 16 to the hopper assembly 12. The next step is to lower the outer front wall 72 such that it covers the entire front of the hopper assembly 12 and the auger housing 48, being held in place by the engagement of securing tabs 74 and securing devices 76. In the preferred embodiment of the dispenser of this invention, the securing tabs 74 on the outer front wall 72 are captured behind cooperating securing devices 76, which are inwardly extending tabs formed on portions of the side walls 24 and 30 which extend in front of front wall portions 26 and 32. The only remaining step is to place the cover 88 on the top of hopper assembly 12.

Figure 3:
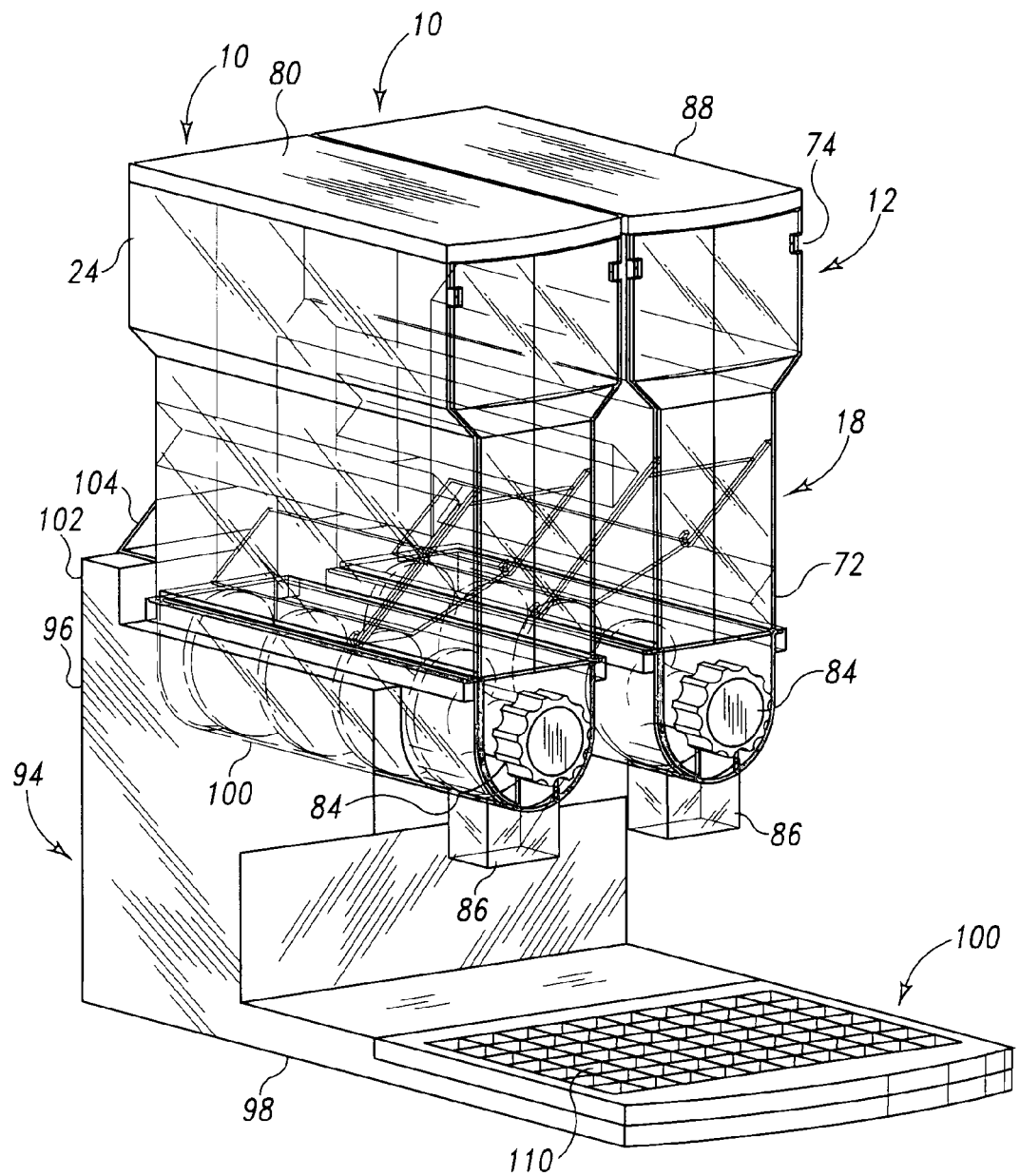
FIG. 3 is a perspective view of two solid bulk material dispensers of this invention as shown in FIG. 1, mounted on a dispenser stand in accordance with this invention.
Figure 4:
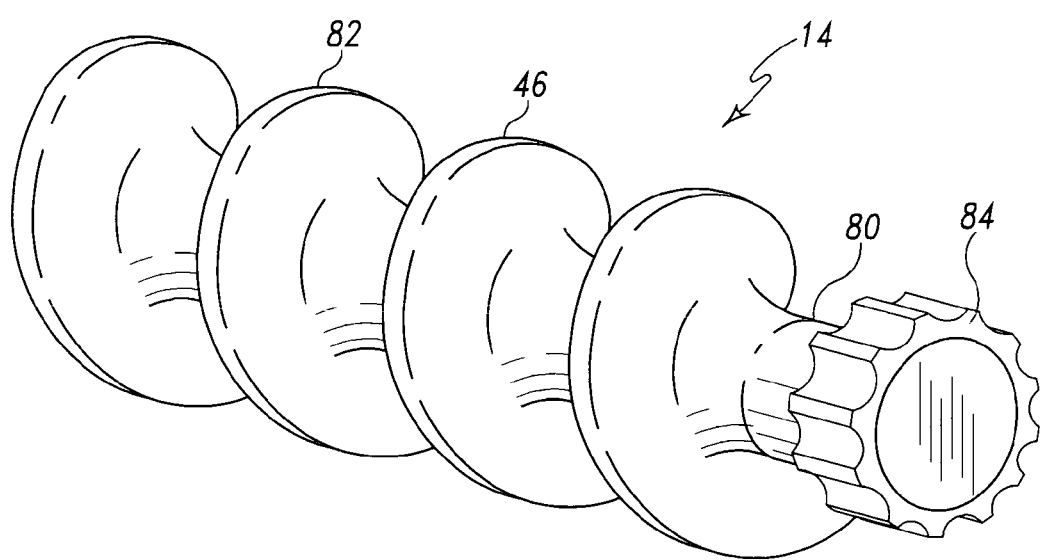
FIG. 4 is a perspective view of the auger of the solid bulk material dispenser of this invention as shown in FIG. 1.

Referring now to FIG. 3, a stand 94 is provided in accordance with this invention for supporting two of the dispensers 10. The L-shaped stand has vertical member 96 and a horizontal member 98. The vertical member 96 is provided with two upwardly opening semi-cylindrical troughs 100, each of which is sized to receive the auger housing 48. A portion 102 of the vertical member 96 extends upwardly behind the auger housing 48 and hopper assembly 12. A bracket assembly 104 is provided on each of the back wall portions 28 and 34, which has a downwardly extending tab 106, which hooks over the portion 102 of the vertical member 96, to hold the dispenser 10 in place on the stand 94. The lower surface of horizontal member 98 of the stand 94 supports the stand on a horizontal surface, and the upper surface supports a bowl or other container which is placed under chute 86 to receive the solid flowable bulk material contained in the hopper when the auger is rotated. A tray 108 having a grid type cover 110 is provided for receiving any spilled solid flowable bulk material.

Figure 5:
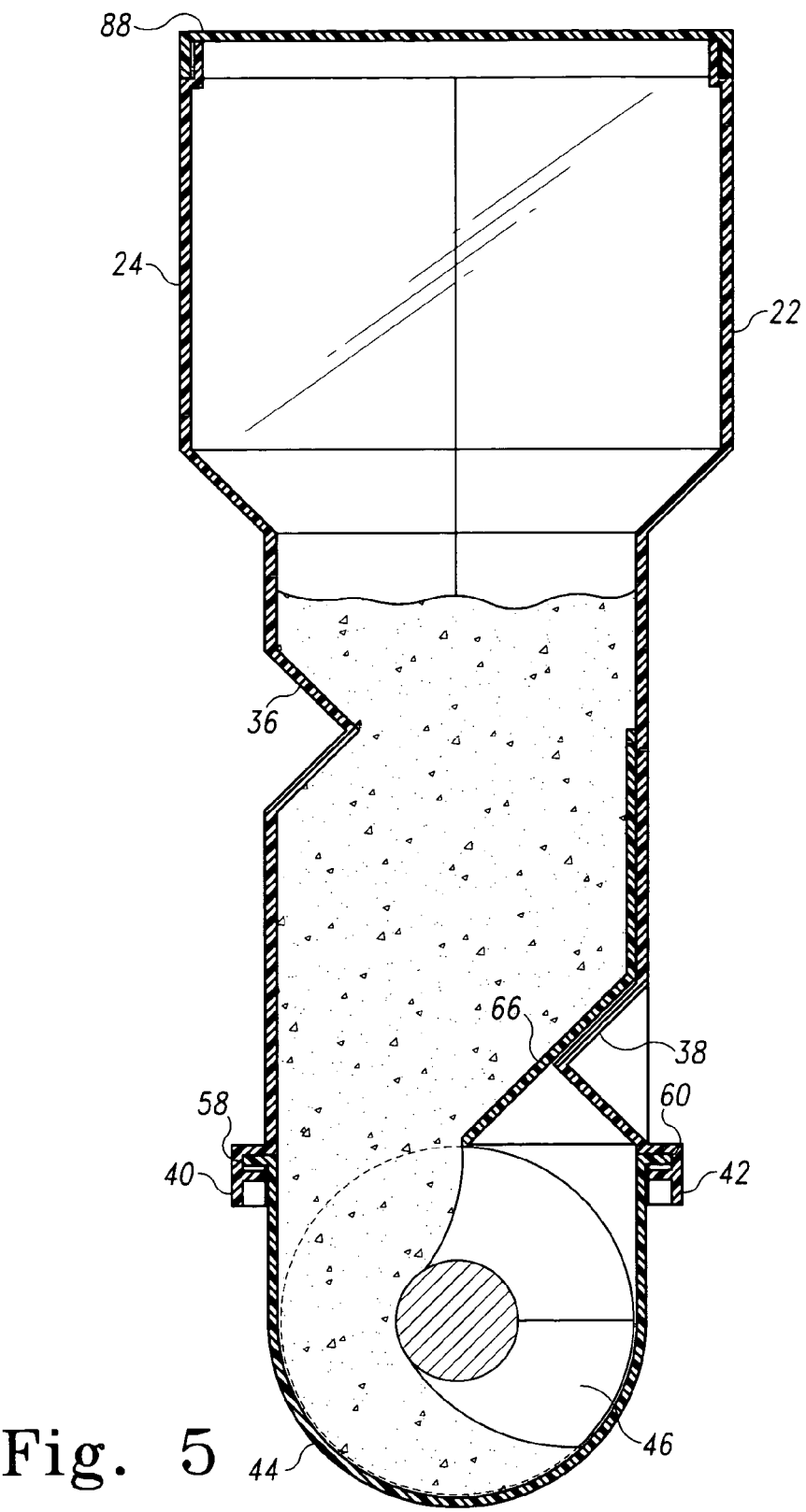
FIG. 5 is a cross-sectional view taken along the line 6-6 in FIG. 2.

Referring now to FIG. 2, it will be seen that a flowable bulk material such as flake type cereal or cereal of a preformed shape, such as that of a small donut, when poured into the top of the hopper will flow downward, first over the deflector 36, and then over deflector 64 which overlays deflector 38. It will also be deflected rearwardly by deflector 66, as it flows into the auger housing 48. As best seen in FIG. 5, the deflector 64 extends downwardly to the top center of the auger 46, so as to be aligned with a vertical plane passing through the central axis of the auger 46. Thus, the cereal is primary directed to only the left side of the auger as shown by the stippling in FIG. 5. However, the cereal will also flow to the right side of the auger 46, into the non-stippled area, but will not completely fill or pack the right side of the auger. Thus, as the auger 46 is turned clockwise to dispense the cereal through chute 86, the auger is only partially filed with cereal. Further, due to the second deflector 66 extending toward the back wall of the hopper, the cereal will not merely flow out of the chute 86 due to gravity flow. The combination of the limited filing of the auger 46 by the deflector 64, and the rearwardly extending deflector 66, even readily flowable materials like donut shaped Cherrios® will not flow from the chute 86 without rotation of the auger 46.

Certain aspects of the design of the solid bulk material dispenser of this invention which are important to its improved performance will now be explained. The auger is designed to both agitate and dispense the solid bulk material as it is rotated. Further, the offset deflectors provided on the walls of the hopper prevent the bulk material from bridging due to settling of the material in the hopper. By offsetting the deflectors, unbalanced settling of the bulk material is created at different levels in the hopper, such that the bulk material can not settle evenly, thereby forming a structural arch or bridge which prevents flow of the bulk material above the bridge. Further, the weight of the bulk material filling the hopper is distributed over the offset deflectors, removing the distributed weight from the auger, thereby relieving the pressure of the bulk material on the auger. Thus, less friction occurs between the auger and the bulk material, which friction would otherwise cause the bulk material to jam around the auger.

As previously set forth, the lowermost offset deflector decreases the amount of product that is fed into the auger housing, thus preventing packing of the bulk material in the auger housing around the auger. The auger housing or chamber in which the auger rotates is of the same circumference as the auger plus or minus several thousands of an inch, so as to eliminate pinching or crushing of product at the bottom of the auger chamber and to allow ease of product movement. Further, product crumb material is moved with the product from the dispenser, thus cleaning the barrel chamber.

The lowermost offset deflector is located directly above the auger at approximately a 45 degree angle, so as to divide the circumference of the auger in half, allowing for a flow feed side and a bulk product movability side. That is, the bulk product is only fed into one side of the auger threads, thereby minimizing pressure around the auger threads. Further, the lowermost offset deflector which is positioned just above the auger has a lower edge which parallels the axis of the auger, thereby decreasing the amount of product that is sheared or crushed by the auger threads. That is, the leading edge of the deflector and the leading edge of the auger threads meet at severe angles, rather than in blunt surface to surface contact which would shear and crush the bulk material. The stationary deflector holds back the weight and flow of the bulk material, while the leading edge of the auger screw glides by the deflector at an angle to push the bulk material in the feed direction.

In a preferred embodiment of the dispenser for solid flowable bulk material for use with breakfast cereal, the hopper is approximately 18" high, 13" deep, and 4" wide where it connects with the auger housing. The higher baffle extends from the sidewall approximately 5½" above the bottom edge and extends about 1" into the hopper. The outside diameter of the auger is approximately 3.70" as is the inside diameter of the bottom of the auger housing. The core diameter of the auger is approximately 1¼". The pitch of the auger is approximately 2¾", such that the auger has approximately 5 revolutions. The threads of the auger are at an angle of 20 degrees to a line perpendicular to the axis of the screw, and the angle between adjacent sloping side of the screw is approximately 81 degrees.

While not illustrated, various modifications and embodiments of the dispenser for solid flowable bulk material of this invention are apparent. For instance, additional off-set baffles or deflectors could be provided on the sidewalls of the hopper. Further, while a rectangular hopper is preferred in that it takes up less counter length, the hopper need not be rectangular in cross-section, it could be square or cylindrical. While a stand is illustrated for two side-by-side dispensers, it might be desirable to provide a stand for a single dispenser, or for three or more dispensers.

While a preferred embodiment of the dispenser for solid flowable bulk material of this invention has been shown and described, it should be apparent to those skilled in the art that what has been described is considered at present to be an exemplary embodiment of the dispenser for solid flowable bulk material of this invention. In accordance with the Patent Statute, changes may be made in the dispenser without actually departing from the true spirit and scope of this invention. The appended claims are intended to cover all such changes and modifications which fall in the true spirit and scope of this invention.

What is claimed is:

1. A dispenser for solid flowable bulk material comprising: an auger dispensing mechanism, said auger dispensing mechanism including an auger having an outer diameter, a central axis, a top center located on said outer diameter in a vertical plane passing through said central axis, and having a loading portion and a dispensing end, and a housing having a semi-cylindrical bottom with an internal radius essentially corresponding to the outer diameter of said auger, a hopper assembly positioned over said auger dispensing mechanism, said hopper assembly including a hopper having a pair of opposing sidewalls formed in planes parallel to the central axis of the auger, at least one deflector extending inwardly and downwardly from each sidewall and having a lower edge, said at least one deflector on each sidewall being vertically spaced from each other, the lower edge of one of said deflectors being aligned with the central axis of the auger, and positioned immediately adjacent to the top center of the auger such that with respect to a vertical plane passing through the central axis of the auger, a solid flowable bulk material to be dispensed from the hopper flows downward onto said auger on only one side of said vertical plane.

2. The dispenser for solid flowable bulk material of claim 1, wherein said auger housing includes a chute through which the solid flowable bulk material is dispensed upon rotation of the auger.

3. The dispenser for solid flowable bulk material of claim 1, wherein a knob is provided on an end of said auger for rotating said auger by hand to dispense the solid flowable bulk material.

4. The dispenser for solid flowable bulk material of claim 1, wherein an additional deflector extending inwardly and downwardly in said hopper over the dispensing end of said auger to prevent the flow of the solid flowable bulk material in the auger near the dispensing end of said auger.

5. The dispenser for solid flowable bulk material of claim 4, wherein the inwardly and downwardly extending end of said additional deflector is positioned such that one complete turn of the auger is located between said dispensing end of said auger and said inwardly and downwardly extending end of said additional deflector, whereby the solid flowable bulk material will not flow out of the dispensing end of said auger without rotation of said auger.

6. A dispenser for solid flowable bulk material comprising:
an auger dispensing mechanism, said auger dispensing mechanism including an auger having an outer diameter a central axis, a top center located on said outer diameter in a vertical plane passing through said central axis, and having a loading portion and a dispensing end, and a housing having sidewalls, said sidewalls having top edges, and a semi-cylindrical bottom with an internal radius essentially corresponding to the outer diameter of said auger,
a hopper assembly positioned over said auger dispensing mechanism, said hopper assembly including a hopper having a pair of opposing sidewalls, having bottom edges, formed in planes parallel to the central axis of the auger, socket like projections provided at the bottom edge of said hopper assembly sidewalls, and outwardly extending projections provided at the top edges of said sidewall of said auger housing, such that said outwardly extending projections are received in said socket like projections to attach said hopper assembly to said auger dispensing mechanism, at least one deflector extending inwardly and downwardly from each sidewall of said hopper assembly, said at least one deflector on each sidewall being vertically spaced from each other, one of said deflectors positioned such that its lower edge is immediately adjacent the top center of the auger and aligned with the central axis of the auger, whereby a solid flowable bulk material to be dispensed flows downward from the hopper onto only one side of said auger.

7. The dispenser for solid flowable bulk material of claim 6, wherein an outer front wall is provided with securing tabs, and said hopper assembly is provided with securing devices, whereby when said securing tabs are engaged with said securing devices, said outer front wall prevents a dis-attachment of said hopper assembly and said auger dispensing mechanism.

8. A dispenser for solid flowable bulk material comprising:
an auger dispensing mechanism, said auger dispensing mechanism including an auger having an outer diameter, a central axis, a top center located on said outer diameter in a vertical plane passing through said central axis, and having a loading portion and a dispensing end, and a housing having a semi-cylindrical bottom with an internal radius essentially corresponding to the outer diameter of said auger, said auger housing having a rear wall with a hole being provided in said rear wall, and a front wall, with an upwardly opening slot being provided in said front wall, said auger having first and second ends, said first and second ends being provided with cylindrical shafts, with said cylindrical shaft at said first end being received in the hole in said rear wall, and the cylindrical shaft at said second end being received in said slot, whereby said auger is readily removed from said auger housing for cleaning of said auger and auger housing,
a hopper assembly positioned over said auger dispensing mechanism, said hopper assembly including a hopper having a pair of opposing sidewalls formed in planes parallel to the central axis of the auger, at least one deflector having a lower edge extending inwardly and downwardly from each sidewall, said at least one deflector on each sidewall being vertically spaced from each other, one of said deflectors positioned such that its lower edge is immediately adjacent the top center of the auger and aligned with the central axis of the auger, whereby a solid flowable bulk material to be dispensed flows downward from the hopper onto only one side of said auger.

* * * * *